(12) United States Patent
Amin et al.

(10) Patent No.: US 11,496,918 B2
(45) Date of Patent: Nov. 8, 2022

(54) AUTOMATING 5G CORE NETWORK TESTING

(71) Applicant: T-Mobile USA, Inc., Bellevue, WA (US)

(72) Inventors: Rahul Amin, Issaquah, WA (US); Monica Baranwal, Redmond, WA (US); Tingchun Kang, Redmond, WA (US); Rex Maristela, Renton, WA (US); Shubham Mehta, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 186 days.

(21) Appl. No.: 17/031,853

(22) Filed: Sep. 24, 2020

(65) Prior Publication Data

US 2022/0095141 A1    Mar. 24, 2022

(51) Int. Cl.
*H04L 12/00* (2006.01)
*H04W 24/10* (2009.01)
*H04W 24/08* (2009.01)
*H04W 24/02* (2009.01)

(52) U.S. Cl.
CPC .......... *H04W 24/10* (2013.01); *H04W 24/02* (2013.01); *H04W 24/08* (2013.01)

(58) Field of Classification Search
None
See application file for complete search history.

(56) References Cited

U.S. PATENT DOCUMENTS

| | | |
|---|---|---|
| 7,206,313 B2 | 4/2007 | Maher et al. |
| 7,260,060 B1 | 8/2007 | Abaye et al. |
| 7,260,518 B2 | 8/2007 | Kerr et al. |
| 7,281,043 B1 | 10/2007 | Davie |
| 7,769,851 B1 | 8/2010 | Guruswamy et al. |
| 7,864,752 B1 | 1/2011 | Bennett et al. |
| 8,271,667 B2 | 9/2012 | Hoshino et al. |
| 8,588,109 B2 | 11/2013 | Li et al. |
| 8,675,488 B1 | 3/2014 | Sidebottom et al. |
| 9,026,644 B2 | 5/2015 | Parker et al. |

(Continued)

FOREIGN PATENT DOCUMENTS

WO    WO-2021164868 A1 *    8/2021

*Primary Examiner* — Noel R Beharry
*Assistant Examiner* — Lionel Preval
(74) *Attorney, Agent, or Firm* — Perkins Coie LLP

(57) ABSTRACT

The disclosed method tests performance of a wireless telecommunication network. The method obtains from the network a network trace including packets exchanged among devices associated with the network. The method identifies packets within the network trace that match properties specified by the first and second tables, and obtains a call flow by chronologically mapping the identified packets, using the timestamps of the packets. The method determines whether a packet associated with the call flow matches the properties specified by the third table by comparing an IE value contained in the packet to the IE value included in the third table. Based on the determining, the method creates a call flow validation results report indicating whether the call flow satisfied the properties specified in the multiple tables. The call flow validation results report can indicate whether the network has passed the test, and/or whether the wireless network has any problematic components.

20 Claims, 10 Drawing Sheets

(56) References Cited

U.S. PATENT DOCUMENTS

| | | |
|---|---|---|
| 9,473,644 B2 | 10/2016 | Wah et al. |
| 10,523,562 B2 | 12/2019 | Zheng |
| 2003/0227942 A1 | 12/2003 | Maher et al. |
| 2004/0098619 A1 | 5/2004 | Shay |
| 2004/0249983 A1 | 12/2004 | Bedner |
| 2005/0176413 A1 | 8/2005 | Lee et al. |
| 2005/0220039 A1 | 10/2005 | Hoshino et al. |
| 2006/0114885 A1 | 6/2006 | Baek et al. |
| 2007/0110060 A1 | 5/2007 | Miki et al. |
| 2007/0263615 A1 | 11/2007 | Zhu et al. |
| 2008/0037430 A1 | 2/2008 | Wah et al. |
| 2008/0062966 A1 | 3/2008 | Den et al. |
| 2008/0247404 A1 | 10/2008 | Yamazaki |
| 2009/0003354 A1 | 1/2009 | Sreedharan |
| 2009/0100169 A1 | 4/2009 | Allen et al. |
| 2010/0154030 A1 | 6/2010 | Montemurro et al. |
| 2010/0161795 A1 | 6/2010 | Deridder et al. |
| 2010/0167734 A1 | 7/2010 | Jones et al. |
| 2012/0233311 A1 | 9/2012 | Parker et al. |
| 2016/0294689 A1 | 10/2016 | Zheng |

\* cited by examiner

Base URI Isolator Table

| ID | Call Leg | Request / Response | Base URI |
|---|---|---|---|
| 1.1 | AMF->SMF: Create Session (MO) | Request | /nsmf-pdusession/v1/sm-contexts |
| 1.2 | SMF->UDM: Reg (MO) | Request | /nudm-uecm/v1 |
| 1.3 | UDM->SMF: Reg Resp | Response | /nudm-uecm/v1 |
| 1.4 | SMF->PCF: Create Policy (MO) | Request | /npcf-smpolicycontrol/v1/sm-policies |
| 1.5 | PCF->SMF: Create Policy Resp | Response | /npcf-smpolicycontrol/v1/sm-policies |
| 1.6 | SMF->CHF: Create Charging (MO) | Request | /nchf-convergedcharging/v2/chargingdata |
| 1.7 | CHF->SMF: Create Charging Resp | Response | /nchf-convergedcharging/v2/chargingdata |
| 1.8 | PCF->SMF: Add Audio Rules (MO) | Request | /callbacks/v1/smPoliciesUpdateNotification |
| 1.9 | SMF->UPF: Audio Rules Resp | Response | /callbacks/v1/smPoliciesUpdateNotification |

*FIG. 3A*

Specific Resource Isolator Table

| ID | SpecificResourceURI | Operation | Packet Isolator IE |
|---|---|---|---|
| 1.1 | | | supi:imsi-310310140000144 |
| 1.2 | imsi-310310140000144 | registrations | |
| 1.3 | imsi-310310140000144 | registrations | |
| 1.4 | | | supi:imsi-310310140000144 |
| 1.5 | | | |
| 1.6 | | | supi:imsi-310310140000144, invocationSequenceNumber:1 |
| 1.7 | | | |
| 1.8 | imsi-310310140000144 | update | |
| 1.9 | | update | |

IE Validator Table

| ID | IE Validation |
|---|---|
| 1.1 | supi:imsi-310310140000144, requestType:INITIAL_REQUEST, ratType:NR, dnn:ims.lab |
| 1.2 | dnn:ims.lab |
| 1.3 | dnn:ims.lab |
| 1.4 | ratType:NR, 5qi:5, downlink:100000 Kbps, uplink:100000 Kbps |
| 1.5 | pccRuleId:cbn#ims, uplink:100000 Kbps, downlink:100000 Kbps, 5qi:5 |
| 1.6 | invocationSequenceNumber:1, ratType:NR, 5qi:5, supi:imsi-310310140000144 |
| 1.7 | volumeLimit64:102400, triggerType:VOLUME_LIMIT, triggerType:MAX_NUMBER_OF_CHANGES_IN_CHARGING_CONDITIONS |
| 1.8 | pccRuleId:_1_1_1_SIP_VONR_AUDIO, pccRuleId:_1_1_2_SIP_VONR_AUDIO, ratingGroup:200, serviceId:10, serviceId:20 |
| 1.9 | |

*FIG. 3C*

AUTOMATING 5G CORE NETWORK TESTING

BACKGROUND

A wireless telecommunications network is a group of nodes interconnected by links that are used to exchange messages between the nodes. The links can use a variety of technologies based on the methodologies of circuit switching, message switching, or packet switching, to pass messages and signals. The wireless telecommunication networks can contain billions of nodes such as mobile devices, antennas, cell towers, routers, domain name servers, etc. Given the complexity of the wireless telecommunication network, testing the performance of the network or determining how a change to the network will affect the performance of the network is difficult.

BRIEF DESCRIPTION OF THE DRAWINGS

FIGS. 3A-3C show, in more detail, the three tables, namely, base URI isolator table (BIT), specific resource URI isolator table (SIT), and IE validator table (IVT).

DETAILED DESCRIPTION

Disclosed here is a method to test the performance of a 5G wireless telecommunication network. The test can be performed prior to deploying various updates to the 5G network, such as software and hardware updates, or the test can be performed while the network is running, to identify problems within the network. The method obtains from a database multiple tables specifying properties of a packet of interest. The first table can include a base uniform resource identifier (URI) representing a standardized network function (NF). The second table can include a specific resource URI uniquely identifying a device associated with the 5G wireless telecommunication network. The device can be a user equipment device such as a mobile device, a smartwatch, a vehicle, etc., or the device can be a node within the 5G wireless telecommunication network. The third table can include an expected information element (IE) value contained in the packet of interest.

The method obtains from the 5G wireless telecommunication network a network trace including packets exchanged among multiple devices associated with the 5G wireless telecommunication network. The method identifies packets within the network trace that match properties specified by the first and second tables, and obtains a call flow by chronologically mapping the identified packets, using the timestamps of the packets. The method determines whether a packet associated with the call flow matches the properties specified by the third table by comparing an IE value contained in the packet to the IE value included in the third table. Based on the determining, the method creates a call flow validation results report indicating whether the call flow satisfied the properties specified in the multiple tables. The call flow validation results report can indicate whether the 5G wireless network has passed the test, and/or whether the 5G wireless network has any problematic components.

Figure 1:
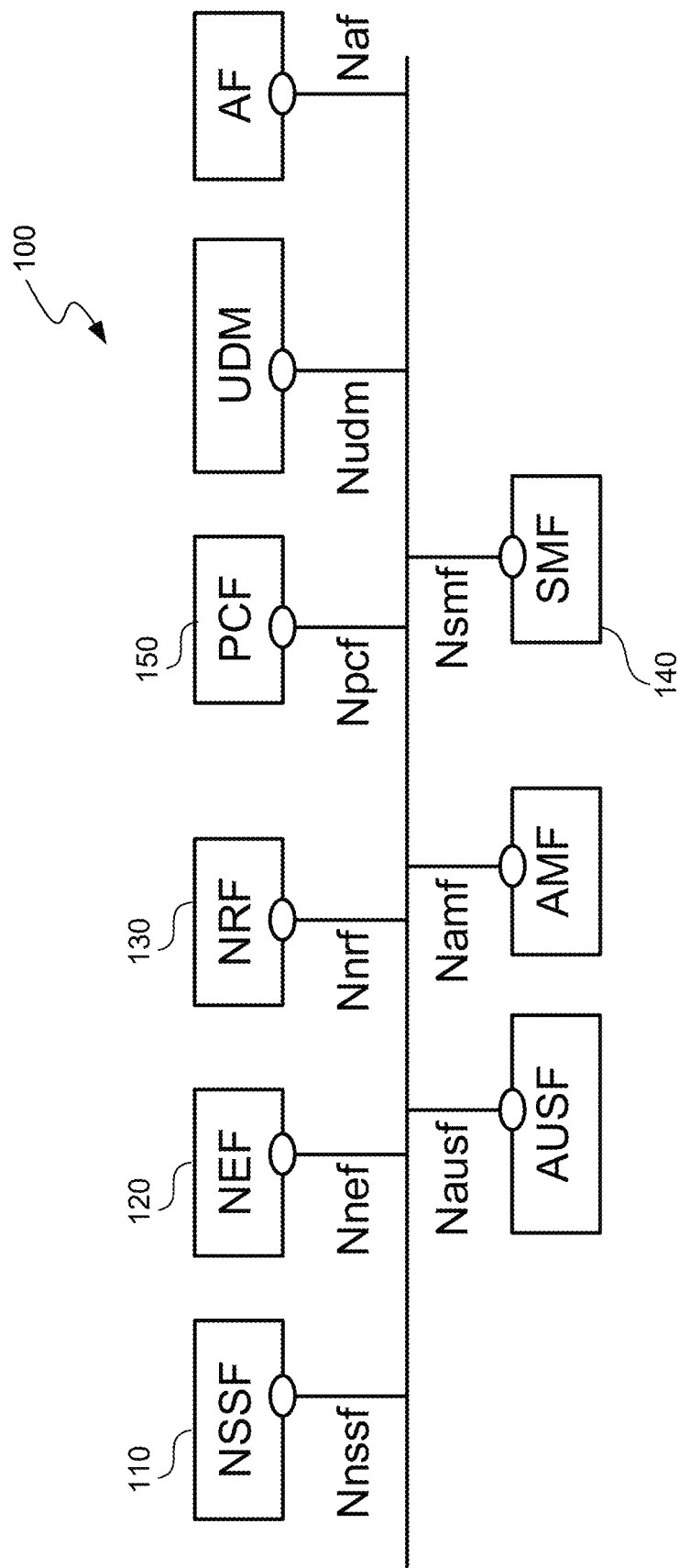
FIG. 1 shows a high-level Service Based Interface (SBI) network.

FIG. 1 shows a high-level SBI network. 3GPP Technical Specification (TS) 23.501 provides specifics of the SBI network 100. The 5G System (5GS) architecture separates the 5G Core Network (5GC) into Control Plane (CP) and User Plane (UP) networks. The 5GC CP is an SBI realized network 100 comprising of NF elements 110, 120, 130, 140, 150 that act as consumers 140 and/or producers 150 of services. This Service Based Architecture (SBA) adheres to a RESTful architecture paradigm mandating NF elements 110, 120, 130, 140, 150 to expose service application programmer interfaces (APIs).

In a typical procedure, an NF consumer invokes a service request to another NF producer using the HTTP method and a URI specific to the service API. A series of these transactional request-responses are aggregated to build a Call Flow (CF), most of which are standardized and are detailed in related NF TSs. Even a basic call flow to provide network service like an audio call has tens of service requests involving the flow of hundreds of IEs. Manually stitching and verifying call flows to ensure call quality is an extremely complex and time-consuming process.

For example, any change in the SBI network 100 that occurs, such as a hardware change, design change, or software patch, creates the risk of malfunction that can affect the users of the network. The system presented here enables automatic testing of the SBI network 100 prior to deployment, and even during the deployment. The testing can include conference calls, three-way calling, video calling, data service, streaming, etc.

For example, the system can be a testing tool in a 5GC CP SBI layer that automates TS compliance testing of both standardized and customized 3GPP call flows. The system can also be a monitoring tool to monitor performance of a wireless telecommunication network, such as a 5G network.

The system can include a CFDB and an artificial intelligence (AI) algorithm that can retrieve information from the CFDB and process the network trace captured in a wireless or communication network to automate end-to-end (E2E) call flow isolation, stitching, and validation. The system can isolate a specific service message/packet, for example, a call leg from any captured trace, then stitch the call flow, and verify observed IE values. The system can leverage the 5GC CP standardization which exclusively uses HTTP/2 request-response messages with exposed service API URIs for communication among NF elements 110, 120, 130 and uses JSON for structured data representation and serialization.

Figure 2:
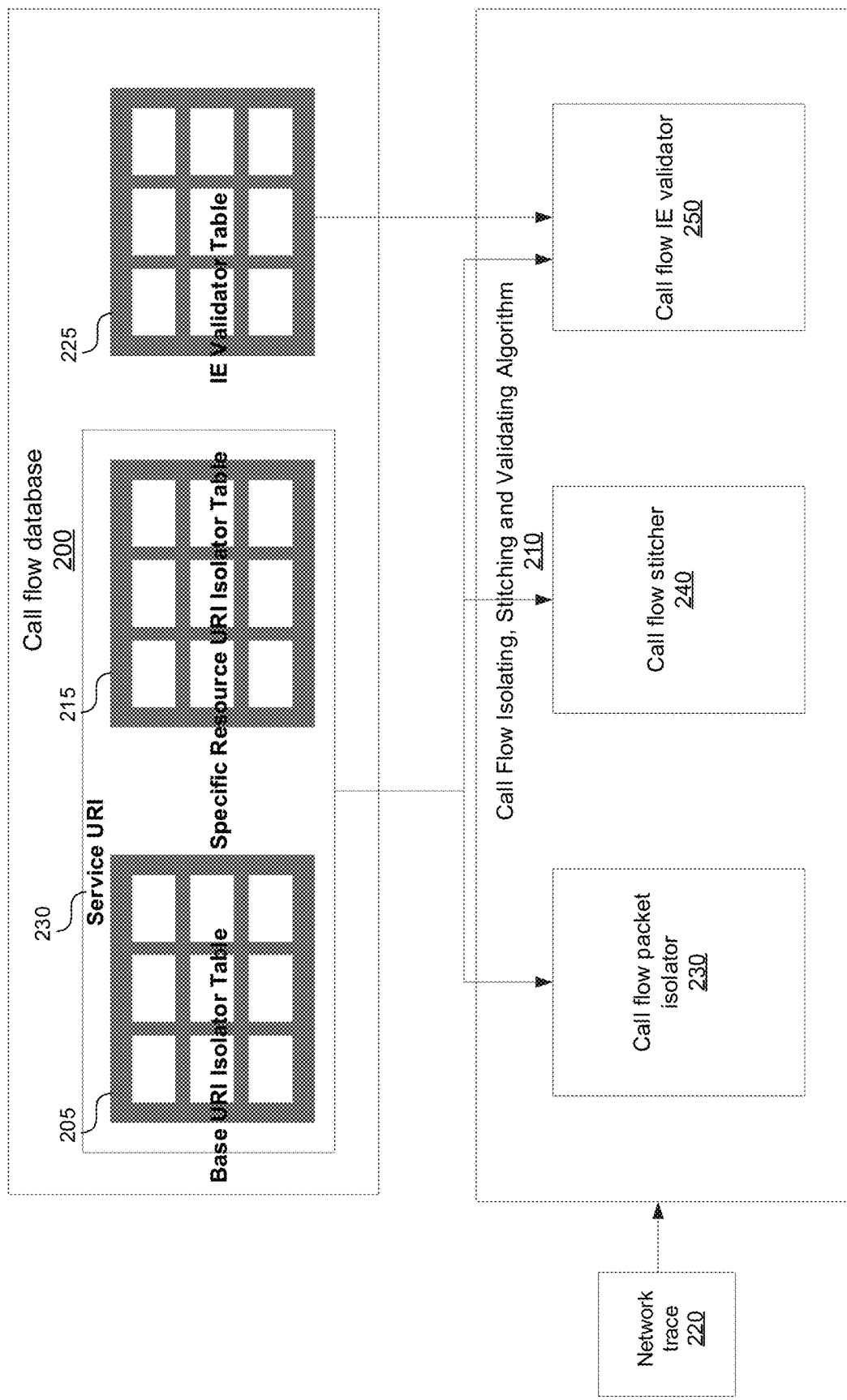
FIG. 2 shows the two main components of the system including a Call Flow Database (CFDB or "database") and Call Flow Packet Isolation, Stitching and Validation Algorithm (CFISVA).

FIG. 2 shows the two main components of the system including a CFDB ("database"), and CFISVA. The information component, namely, the database 200, is separate from the algorithmic component CFISVA 210. CFDB 200 is a database of multiple tables including BIT 205, SIT 215, IVT 225 containing information required to verify an E2E call flow.

CFISVA 210 is a state machine with algorithms that retrieve data from database 200 and operate on a network trace 220 to: in step 230, isolate packets based on information contained in tables BIT 205, SIT 215, IVT 225; in step 240, stitch a call flow using BIT 205; and finally, in step 250, verify that observed IE values within each call leg match the IE specified in IVT 225. CFISVA's 210 core is a search algorithm to isolate a specific packet from a network trace 220. The efficacy of the search algorithm depends on the search criteria stored in the database 200, but the search criteria stored in the database 200 are not enough to stitch an E2E call flow. Consequently, other techniques are used to stitch the E2E call flow as a part of CFISVA 210. The other technologies can include searching data within a packet, and chronologically mapping these isolated packets against the expected sequence of call flow service requests. The crux of CFISVA 210 is to isolate one or more specific packets for analysis and verification.

Figure 3B:
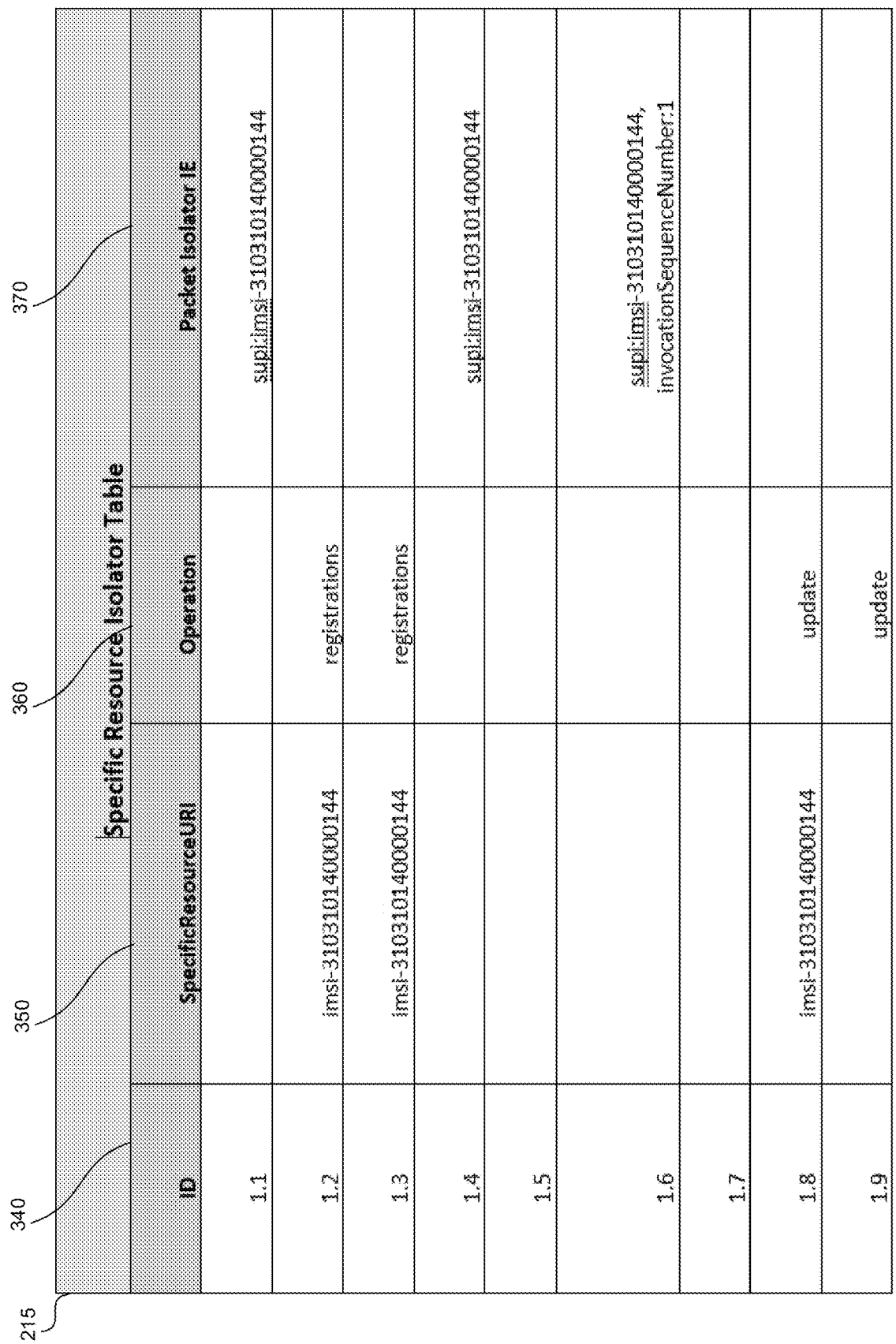

FIGS. 3A-3C show, in more detail, the three tables, namely, BIT 205, SIT 215, and IVT 225. The BIT 205, SIT 215, and IVT 225 can all be stored in the database 200.

The first two tables BIT 205 and SIT 215 identify the URI. A brief description of the URI types with an example is provide below. An NF service URI in 5GC CP has the following structure, according to 3GPP TS 129.501:

{apiRoot}/{apiName}/{apiVersion}/{apiSpecificResourceUriPart}

This NF service URI has both a dynamic part and a static part, which are classified as BaseURl and SpecificResourceURl, respectively. BaseURl contains the first three parts of the URI as a Base URI, namely, apiRoot, apiName, and apiVersion. This Base URI is a standardized NF service URI and is of static nature. SpecificResourceURl contains the last part, namely, apiSpecificResourceUriPart, which is unique to the resource. SpecificResourceURl can be a resource parameter like Subscription Permanent Identifier (SUPI) or can as well be determined during run-time. SUPI is a 5G globally unique identifier allocated to each subscriber and defined in 3GPP specification TS 23.501. The varying/dynamic URI implies the algorithm will have to use multiple techniques to search and isolate specific packets.

The 3GPP 5G NF specification defines service URIs for every procedure in the 5GC. The database 200 is built using these service URIs and can include the call leg specific IEs that can be verified within a call leg. To achieve this, the database 200 includes the three tables with a common key across the tables to correlate data: BIT 205, SIT 215, and IVT 225.

The purpose of BIT 205 in FIG. 3A is to provide data to CFISVA to isolate potential packets in the network trace based on the BaseURl. The BIT 205 in FIG. 3A shows a partial Voice over New Radio (VONR) call flow.

A hardware or software processor executing instructions described in this specification can populate the BIT 205 using service URIs for each call leg as required for a specific call flow. The BIT 205 contains the following fields: ID 300, call leg 310, request/response 320, and BaseURl 330.

ID 300 is a common field, for example, common key, used across all the tables to identify and correlate specific call legs. Call leg 310 describes the service invoked by NF consumer. Request/response 320 is a binary field to identify the HTTP/2 message type. BaseURl 330 is the 3GPP specified service API URI as is exposed by NF producer.

The purpose of SIT 215 in FIG. 3B is to further narrow down the packet from a network trace to packets that contain a specific resource. The SIT 215 can provide data to CFISVA to isolate packets that contain (1) SpecificResourceURl parameters and (2) IEs. The SIT 215 contains the following fields: ID 340, SpecificResourceURl 350, operation 360, packet isolator IE 370.

ID 340 is a common field used across all tables to identify and correlate specific call legs, and it corresponds to ID 300 and table 205. When ID 340 and ID 300 are the same, that means that the entries in the tables 205, 215 associated with ID 340 and ID 300 contain information about the same call leg.

SpecificResourceURl 350 is a user-specific part to the URI to identify a particular user/resource. In many cases this can be SUPI but can as well be dynamically created during run-time and so is left empty in such call legs.

Operation 360 identifies the operation that is to be performed on the resource. Packet isolator IE 370 is a resource-specific field and includes a list of IEs that can be used by CFISVA to isolate a user-specific packet in scenarios where multiple packets were returned using URI match.

IVT 225 in FIG. 3C includes the expected IE values that the CFISVA can compare with observed IE values in packets for a specific call leg to obtain the stitched call flow. The IVT 225 has the following fields: ID 370 and IE validation 380.

ID 370 is a common field used across all tables to identify and correlate specific call legs. When ID 370, ID 340, and ID 300 are the same, that means that the entries in the tables 205, 215, 225 associated with ID 370, ID 340, and ID 300 contain information about the same call leg. IE validation 380 can list all IE key-value pairs that CFISVA can use for verification.

Figure 4:
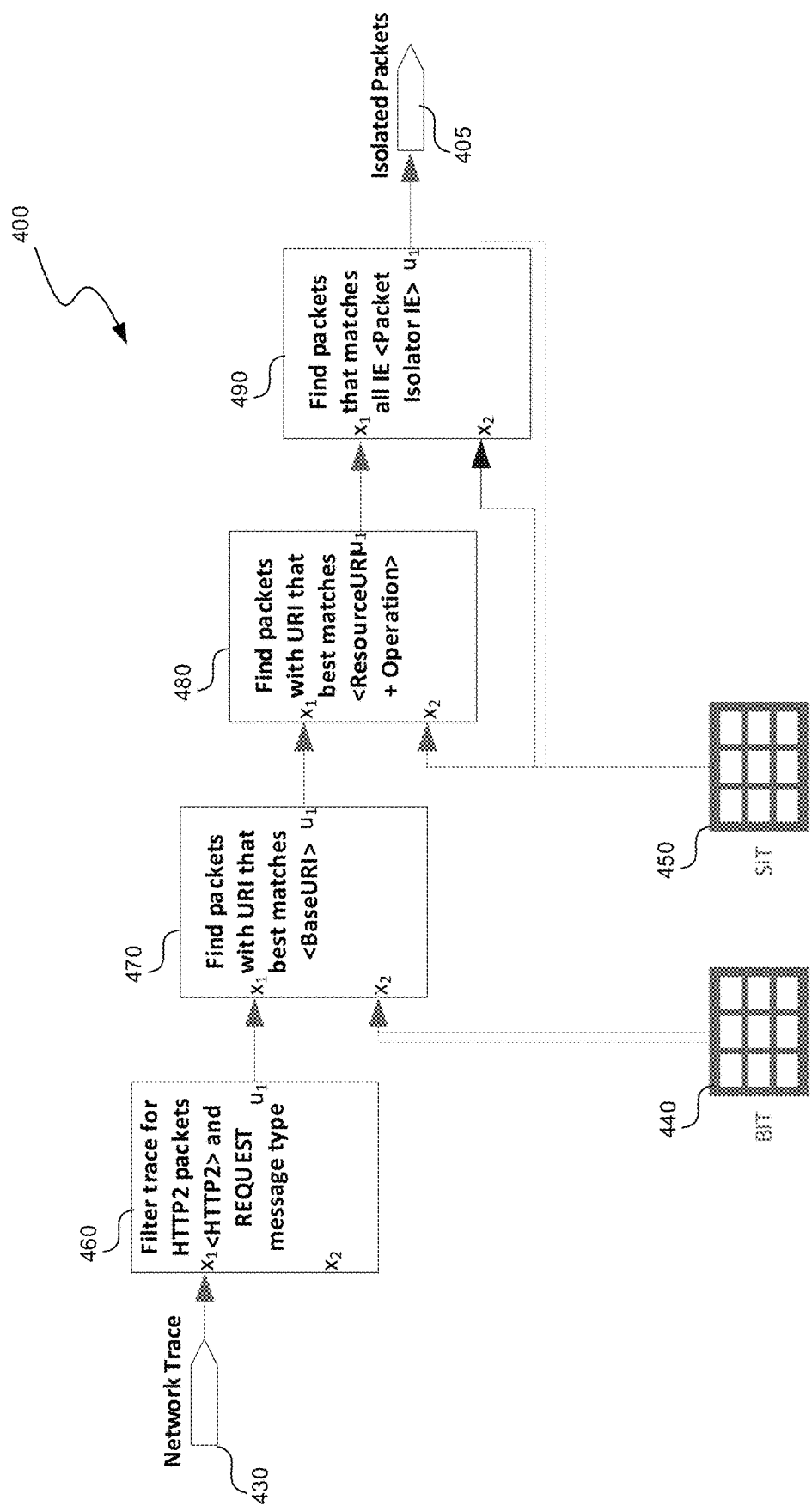
FIGS. 4-6 show the three stages of the CFISVA.
Figure 5:
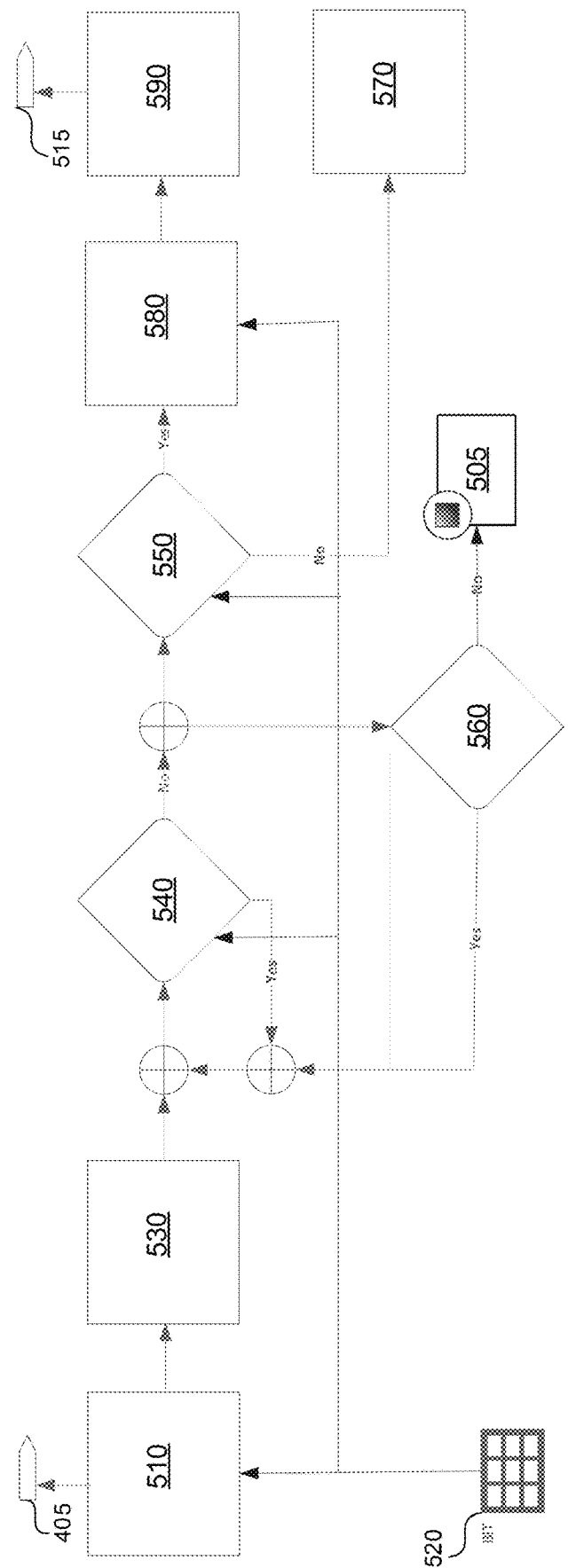
Figure 6:
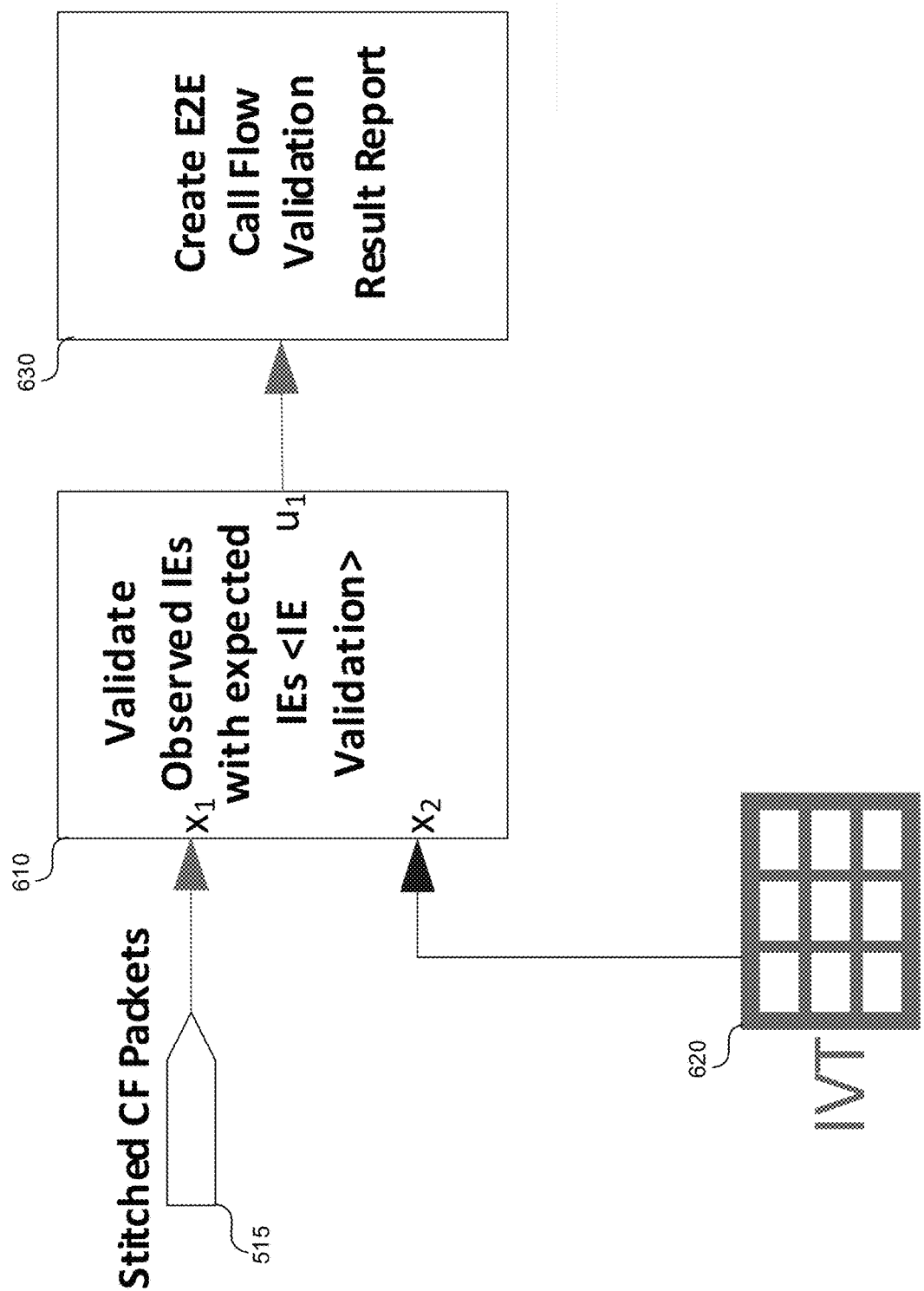

FIGS. 4-6 show the three stages of the CFISVA. The algorithm takes as input a network trace and operates on the network trace to: (1) isolate packets that match the service URI for a particular user/resource, (2) stitch the call flow, and (3) validate IEs in the stitched call flow and report results. FIGS. 4A-4C depict the high-level modules including: call flow packet isolator 400, call flow stitcher 500, call flow validator 600.

Call flow packet isolator 400 in FIG. 4 receives the network trace 430 as input. In step 460, the call flow packet isolator 400 can isolate from the network trace 430 the packet specific to a protocol, such as an HTTP/2 packet containing a request message type. In addition to HTTP/2, the call flow packet isolator 400 can isolate packets belonging to protocols such as GTPv2, PFCP, NGAP. In step 470, the call flow packet isolator 400 can isolate from the packets received from step 460 packets that in addition match the call flow criteria provided by BIT 440, such as all the packets whose URIs match the base URI specified in BIT 440.

In step 480, the call flow packet isolator 400 can isolate from the packets received from step 470 those that in addition match information provided by SIT 450, such as all the packets having a specific resource URI and/or operation contained in the SIT 450. In step 490, the call flow packet isolator 400 can isolate from the packets received from step 480 those that in addition match information provided by column 370 of the SIT 450 to produce isolated packets 405.

Call flow stitcher 500 in FIG. 5 operates on the isolated packets 405 in FIG. 4, to chronologically map them against the related call legs in the order as listed in BIT 520. The call flow stitcher 500 detects and removes call legs that do not collectively form the E2E call flow sequence.

In step 510, the call flow stitcher 500 chronologically maps all request message type packets to the corresponding call leg as listed in BIT 520 and identifies all first call leg request packets as pivot packets. To perform the chronological mapping, the call flow stitcher 500 uses timestamps of packets contained in the isolated packets 405.

In step 530, the call flow stitcher 500 saves the first pivot packet, such as the chronologically earliest pivot packet, among all the identified pivot packets in a call flow stack. In step 540, call flow stitcher 500 obtains the next packet and checks whether the next packet corresponds to the next call leg in BIT 520. If the next packet corresponds to the next call leg in BIT 520, the call flow stitcher 500 pushes the next packet onto the call flow stack, and the call flow stitcher 500 obtains the subsequent packet, and performs the step 540 again. The call flow stitcher 500 performs the step 540 until a packet does not satisfy the condition in step 540, namely, the packet being examined does not correspond to the next call leg.

If the packet does not correspond to the next call leg, the call flow stitcher 500 can perform steps 550 and 560. In step 560, the call flow stitcher 500 can discard the current pivot packet and check if another pivot packet exists. If no other pivot packet exists, in step 505, the call flow stitcher 500 can determine that the network trace search is completed, and can terminate the execution.

In step 550, the call flow stitcher 500 can check whether all the saved packets in the stack have one-to-one mapping with corresponding REQUEST message in BIT 520. In other words, the call flow stitcher 500 can check whether a single packet belongs to multiple call flows. If a single packet belongs to multiple call flows, the call flow stitcher, in step 570, reports that E2E call flow verification has failed.

If a single packet belongs to a single call flow, the call flow stitcher 500, in step 580, for all packets, follows the HTTP/2 stream to retrieve all isolated packets that form the various procedures of the call flow, such as DATA and RESPONSE packets related to the isolated REQUEST packets. The call flow stitcher 500 can use Wireshark to perform packet analysis. In step 590, the call flow stitcher 500 can save the DATA, RESPONSE, and REQUEST packets as E2E stitched call flow.

The call flow stitcher 500 can produce as output the stitched call flow packets 515.

The call flow validator 600 in FIG. 6 takes as an input the call flow packet 515. The call flow validator 600 operates on the stitched call flow packets 515 to verify the IEs in each of the call legs. In step 610, the call flow validator 600 validates that the observed IEs in the stitched call flow packet 515, match the expected IEs contained in the SIT 620. In step 630, the call flow validator 600 creates E2E call flow validation result report.

Figure 7:
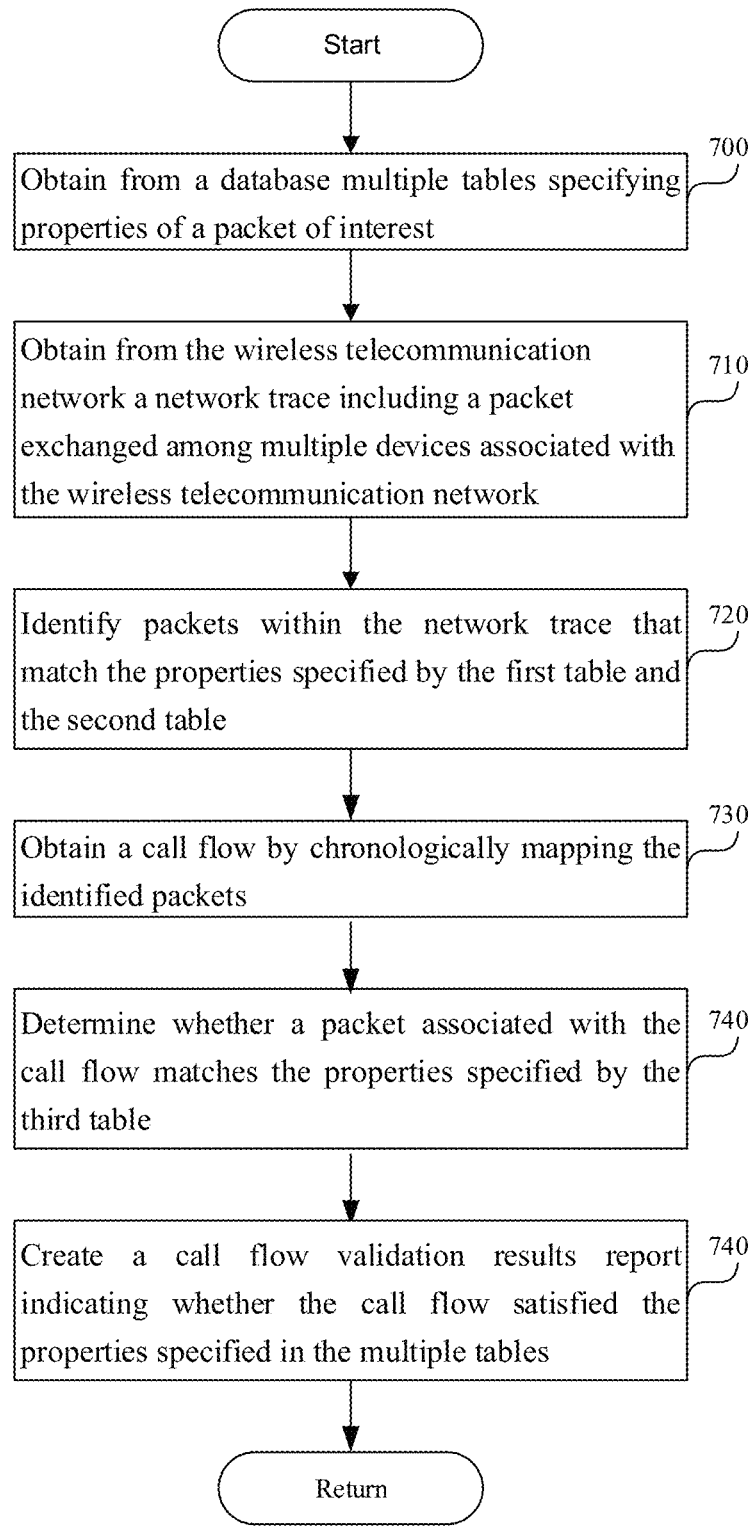
FIG. 7 is a flowchart of a method to test the performance of a wireless telecommunication network, such as a 5G wireless telecommunication network.

FIG. 7 is a flowchart of a method to test performance of a wireless telecommunication network, such as a 5G wireless telecommunication network. In step 700, the processor can obtain from a database multiple tables specifying properties of a packet of interest. Each table among the multiple tables includes a common key correlating data among the multiple tables.

An entry in a first table can include a base URI representing a standardized NF and an identifier identifying a session and a session leg. An entry in a second table can include a specific resource URI uniquely identifying a device associated with the wireless telecommunication network and a packet isolator IE. An entry in a third table among the multiple tables can include an expected IE value contained in the packet of interest.

In step 710, the processor can obtain from the wireless telecommunication network a network trace including a packet exchanged among multiple devices associated with the wireless telecommunication network.

In step 720, the processor can identify packets within the network trace that match the properties specified by the first table and the second table. To identify packets, the processor can identify packets in the network trace matching a specified protocol to obtain protocol packets. The processor can find packets among the protocol packets containing a URI matching the base URI to obtain base URI packets. The processor can find packets among the base URI packets matching the specific resource URI to obtain specific URI packets. Finally, the processor can find packets among the specific URI packets matching the packet isolator IE to obtain the identified packets.

In step 730, the processor can obtain a call flow by chronologically mapping the identified packets. To obtain the call flow, the processor can chronologically map identified packets within the network trace having a type request to the session leg having a type matching the type request. The processor can identify all chronologically initial packets in the session leg having the type matching the type request to obtain a pivot packet. The processor can create a call flow stack using the pivot packet. The processor can find a chronologically subsequent packet to the pivot packet. The processor can determine whether the chronologically subsequent packet corresponds to a session leg subsequent to the session leg.

Upon determining that the chronologically subsequent packet corresponds to the session leg, the processor can add the chronologically subsequent packet to the call flow stack. The processor can determine whether each packet in the call flow stack belongs to a single call flow. Upon determining that each packet in the call flow stack belongs to the single call flow, the processor can retrieve a remainder of packets related to each packet in the call flow, where each packet among the remainder of packets has a type different from the type request, for example, data and response. The processor can save the remainder of packets in the call flow stack to obtain the call flow.

Conversely, upon determining that the chronologically subsequent packet does not correspond to the session leg, the processor can discard the pivot packet. Upon determining that the chronologically subsequent packet does not correspond to the session leg, the processor can determine whether another pivot packet exists. Upon determining that the other pivot packet exists, the processor can attempt to obtain another call flow. Conversely, upon determining that the other pivot packet does not exist, the processor can complete a search of the network trace.

In step 740, the processor can determine whether a packet associated with the call flow matches the properties specified by the third table by comparing an IE value contained in the packet to the IE value included in the third table. In step 750, based on the determining, the processor can create a call flow validation results report indicating whether the call flow satisfied the properties specified in the multiple tables.

To determine whether the packet associated with the call flow matches the properties specified by the third table, and to generate the call flow validation results report, the processor can obtain the expected IE value from the third table and the IE value contained in the call flow. The processor can determine whether the expected IE value matches the IE value contained in the call flow. Upon determining that the expected IE value matches the IE value contained in the call flow, the processor can create the call flow validation results report, indicating that the call flow matches the expected IE value.

Using an identifier identifying a session and a session leg, the processor can correlate the entry in the first table, the entry in the second table, and the entry in the third table. The identifier can be the common key among the multiple tables. The entry in the first table can include the identifier and the base URI. The entry in the second table can include the identifier and the specific resource URI, and the entry in the third table can include the identifier and the IE value.

Computer

Figure 8:
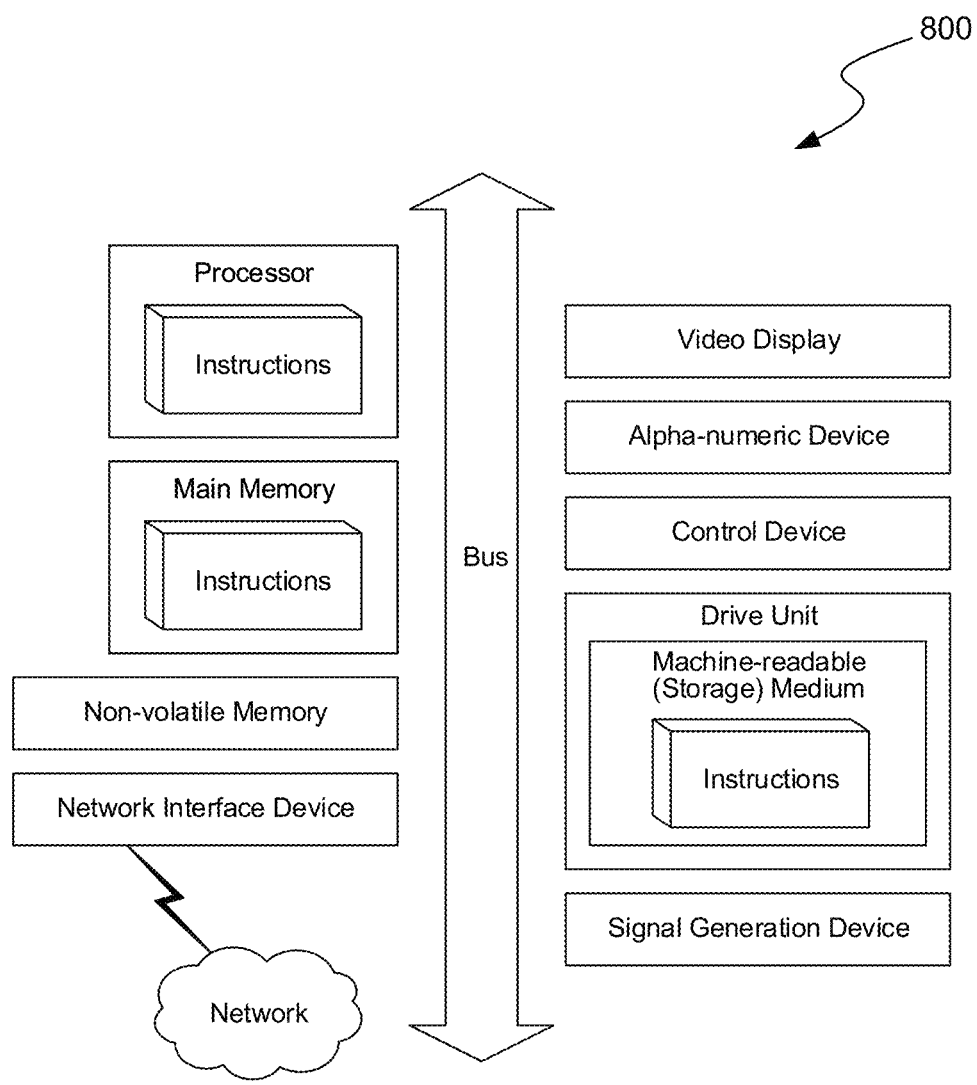
FIG. 8 is a diagrammatic representation of a machine in the example form of a computer system within which a set of instructions, for causing the machine to perform any one or more of the methodologies or modules discussed herein, can be executed.

FIG. 8 is a diagrammatic representation of a machine in the example form of a computer system 800 within which a set of instructions, for causing the machine to perform any one or more of the methodologies or modules discussed herein, can be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components described in the example of FIGS. 1-4 (and any other components described in this specification) can be implemented. The computer system 800 can be of any applicable known or convenient type. The components of the computer system 800 can be coupled together via a bus or through some other known or convenient device.

The processor of the computer system 800 can execute the various instructions described in this specification such as CFISVA 210 in FIG. 2, including call flow packet isolator 400 in FIG. 4, call flow stitcher 500 in FIG. 5, call flow validator 600 in FIG. 6, and the method as shown in FIG. 7. The main memory, non-volatile memory and/or the drive unit of the computer system 800 can store the instructions to be executed by the processor, and can store the multiple tables 205, 215, 225 in FIGS. 2, 3A-3C; 440, 450 in FIG. 4; 520 in FIG. 5; 620 in FIG. 6. The network of the computer system 800 can be used to obtain the network trace 430 in FIG. 4.

This disclosure contemplates the computer system 800 taking any suitable physical form. As example and not by way of limitation, computer system 800 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 can include one or more computer systems 800; be unitary or distributed; span multiple locations; span multiple machines; or reside in a cloud, which can include one or more cloud components in one or more networks. Where appropriate, one or more computer systems 800 can perform without substantial spatial or temporal limitation one or more steps of one or more methods described or illustrated herein. As an example and not by way of limitation, one or more computer systems 800 can perform in real time or in batch mode one or more steps of one or more methods described or illustrated herein. One or more computer systems 800 can perform at different times or at different locations one or more steps of one or more methods described or illustrated herein, where appropriate.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer-readable storage medium" shall also be taken to include any medium that is capable of storing, encoding or carrying a set of instructions for execution by the machine and that cause the machine to perform any one or more of the methodologies or modules of the presently disclosed technique and innovation.

In some circumstances, operation of a memory device, such as a change in state from a binary one to a binary zero or vice versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device can comprise a transformation, such as a physical transformation. Rather, the foregoing are intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A method to test performance of a 5G wireless telecommunication network, the method comprising:
    obtaining, from a database, multiple tables specifying properties of a packet of interest,
        wherein an entry in a first table among the multiple tables includes a base uniform resource identifier (URI) representing a standardized network function (NF),
        wherein an entry in a second table among the multiple tables includes a specific resource URI uniquely identifying a device associated with the 5G wireless telecommunication network, and
        wherein an entry in a third table among the multiple tables includes an expected information element (IE) value contained in the packet of interest;
    obtaining from the 5G wireless telecommunication network a network trace including a packet exchanged among multiple devices associated with the 5G wireless telecommunication network;
    identifying packets within the network trace that match the properties specified by the first table and the second table;
    obtaining a call flow by chronologically mapping the identified packets;
    determining whether a packet associated with the call flow matches the properties specified by the third table by comparing an IE value contained in the packet to the IE value included in the third table; and
    based on the determining, creating a call flow validation results report indicating whether the call flow satisfied the properties specified in the multiple tables.

2. The method of claim 1, comprising:
    correlating the entry in the first table, the entry in the second table, and the entry in the third table using an identifier identifying a session and a session leg,
        wherein the entry in the first table includes the identifier and the base URI,
        wherein the entry in the second table includes the identifier and the specific resource URI, and wherein the entry in the third table includes the identifier and the IE value.

3. The method of claim 1, wherein the entry in the second table includes a packet isolator IE, and wherein identifying packets further comprises:
- identifying packets in the network trace matching a specified protocol to obtain protocol packets;
- finding packets among the protocol packets containing a URI matching the base URI to obtain base URI packets;
- finding packets among the base URI packets matching the specific resource URI to obtain specific URI packets; and
- finding packets among the specific URI packets matching the packet isolator IE to obtain the identified packets.

4. The method of claim 1, wherein the entry in the first table includes the base URI and an identifier identifying a session and a session leg, and wherein obtaining the call flow comprises:
- chronologically mapping the identified packets within the network trace having a type request to the session leg having a type matching the type request;
- identifying all chronologically initial packets in the session leg having the type matching the type request to obtain a pivot packet;
- creating a call flow stack using the pivot packet;
- finding a chronologically subsequent packet to the pivot packet;
- determining whether the chronologically subsequent packet corresponds to a session leg subsequent to the session leg;
- upon determining that the chronologically subsequent packet corresponds to the session leg, adding the chronologically subsequent packet to the call flow stack;
- determining whether each packet in the call flow stack belongs to a single call flow;
- upon determining that each packet in the call flow stack belongs to the single call flow, retrieving a remainder of packets related to each packet in the call flow, wherein each packet among the remainder of packets has a type different from the type request; and
- saving the remainder of packets in the call flow stack to obtain the call flow.

5. The method of claim 1, wherein the entry in the first table includes the base URI and an identifier identifying a session and a session leg, and wherein obtaining the call flow comprises:
- chronologically mapping the identified packets within the network trace having a type request to the session leg having a type matching the type request;
- identifying all chronologically initial packets in the session leg having the type matching the type request to obtain a pivot packet;
- creating a call flow stack using the pivot packet;
- finding a chronologically subsequent packet to the pivot packet;
- determining whether the chronologically subsequent packet corresponds to a session leg subsequent to the session leg;
- upon determining that the chronologically subsequent packet does not correspond to the session leg, discarding the pivot packet;
- upon determining that the chronologically subsequent packet does not correspond to the session leg, determining whether another pivot packet exists; and
- upon determining that the other pivot packet exists, attempting to obtain another call flow.

6. The method of claim 1, wherein the entry in the first table includes the base URI and an identifier identifying a session and a session leg, and wherein obtaining the call flow comprises:
- chronologically mapping the identified packets within the network trace having a type request to the session leg having a type matching the type request;
- identifying all chronologically initial packets in the session leg having the type matching the type request to obtain a pivot packet;
- creating a call flow stack using the pivot packet;
- finding a chronologically subsequent packet to the pivot packet;
- determining whether the chronologically subsequent packet corresponds to a session leg subsequent to the session leg;
- upon determining that the chronologically subsequent packet does not correspond to the session leg, discarding the pivot packet;
- upon determining that the chronologically subsequent packet does not correspond to the session leg, determining whether another pivot packet exists; and,
- upon determining that the another pivot packet does not exist, completing a search of the network trace.

7. A system comprising:
- one or more processors;
- memory coupled to the one or more processors, wherein the memory includes instructions executable by the one or more processors to:
  - obtain, from a database, multiple tables specifying properties of a packet of interest,
    - wherein the multiple tables include a first table, second table, and a third table,
    - wherein each table among the multiple tables includes a common key correlating data among the multiple tables;
  - obtain from a wireless telecommunication network a network trace including a packet exchanged among multiple devices associated with the wireless telecommunication network;
  - identify packets within the network trace that match the properties specified by the first table and the second table;
  - obtain a call flow by chronologically mapping the identified packets;
  - determine whether a packet associated with the call flow matches the properties specified by the third table by comparing an IE value contained in the packet to the IE value included in the third table; and
  - based on the determining, create a call flow validation results report indicating whether the call flow satisfied the properties specified in the multiple tables.

8. The system of claim 7,
- wherein an entry in the first table among the multiple tables includes a base uniform resource identifier (URI) representing a standardized network function (NF),
- wherein an entry in the second table among the multiple tables includes a specific resource URI uniquely identifying a device associated with the wireless telecommunication network, and
- wherein an entry in the third table among the multiple tables includes an expected information element (IE) value contained in the packet of interest.

9. The system of claim 7, comprising:
  correlate an entry in the first table, an entry in the second table, and an entry in the third table using an identifier identifying a session and a session leg,
    wherein the entry in the first table includes the identifier and the base URI,
    wherein the entry in the second table includes the identifier and a specific resource URI, and
    wherein the entry in the third table includes the identifier and the IE value.

10. The system of claim 7, wherein an entry in the second table includes a packet isolator IE, and wherein the instructions to identify the packets further comprise the instructions to:
  identify packets in the network trace matching a specified protocol to obtain protocol packets;
  find packets among the protocol packets containing a URI matching the base URI to obtain base URI packets;
  find packets among the base URI packets matching a specific resource URI to obtain specific URI packets; and
  find packets among the specific URI packets matching the packet isolator IE to obtain the identified packets.

11. The system of claim 7, wherein an entry in the first table includes the base URI and an identifier identifying a session and a session leg, and wherein the instructions to obtain the call flow further comprise the instructions to:
  chronologically map the identified packets within the network trace having a type request to the session leg having a type matching the type request;
  identify all chronologically initial packets in the session leg having the type matching the type request to obtain a pivot packet;
  create a call flow stack using the pivot packet;
  find a chronologically subsequent packet to the pivot packet;
  determine whether the chronologically subsequent packet corresponds to a session leg subsequent to the session leg;
  upon determining that the chronologically subsequent packet corresponds to the session leg, add the chronologically subsequent packet to the call flow stack;
  determine whether each packet in the call flow stack belongs to a single call flow;
  upon determining that each packet in the call flow stack belongs to the single call flow, retrieve a remainder of packets related to each packet in the call flow,
    wherein each packet among the remainder of packets has a type different from the type request; and
  save the remainder of packets in the call flow stack to obtain the call flow.

12. The system of claim 7, wherein an entry in the first table includes the base URI and an identifier identifying a session and a session leg, and wherein the instructions to obtain the call flow comprise instructions to:
  chronologically map the identified packets within the network trace having a type request to the session leg having a type matching the type request;
  identify all chronologically initial packets in the session leg having the type matching the type request to obtain a pivot packet;
  create a call flow stack using the pivot packet;
  find a chronologically subsequent packet to the pivot packet;
  determine whether the chronologically subsequent packet corresponds to a session leg subsequent to the session leg;
  upon determining that the chronologically subsequent packet does not correspond to the session leg, discard the pivot packet;
  upon determining that the chronologically subsequent packet does not correspond to the session leg, determine whether another pivot packet exists; and
  upon determining that the other pivot packet exists, attempt to obtain another call flow.

13. The system of claim 7, wherein an entry in the first table includes the base URI and an identifier identifying a session and a session leg, and wherein the instructions to obtain the call flow comprise the instructions to:
  chronologically map the identified packets within the network trace having a type request to the session leg having a type matching the type request;
  identify all chronologically initial packets in the session leg having the type matching the type request to obtain a pivot packet;
  create a call flow stack using the pivot packet;
  find a chronologically subsequent packet to the pivot packet;
  determine whether the chronologically subsequent packet corresponds to a session leg subsequent to the session leg;
  upon determining that the chronologically subsequent packet does not correspond to the session leg, discard the pivot packet;
  upon determining that the chronologically subsequent packet does not correspond to the session leg, determine whether another pivot packet exists; and,
  upon determining that the another pivot packet does not exist, complete a search of the network trace.

14. The system of claim 7,
  wherein the instructions to determine whether the packet associated with the call flow matches the properties specified by the third table comprise instructions to:
    obtain an expected IE value from the third table, and the IE value contained in the call flow;
    determine whether the expected IE value matches the IE value contained in the call flow; and
    upon determining that the expected IE value matches the IE value contained in the call flow, create the call flow validation results report.

15. At least one computer-readable medium, excluding transitory signals and carrying instructions that, when executed by at least one data processor, performs a method comprising:
  obtaining, from a database, multiple tables specifying properties of a packet of interest,
    wherein an entry in a first table among the multiple tables includes a base uniform resource identifier (URI) representing a standardized network function (NF),
    wherein an entry in a second table among the multiple tables includes a specific resource URI uniquely identifying a device associated with the 5G wireless telecommunication network, and
    wherein an entry in a third table among the multiple tables includes an expected information element (IE) value contained in the packet of interest;
  obtaining from the wireless telecommunication network a network trace including a packet exchanged among multiple devices associated with the wireless telecommunication network;
  identifying packets within the network trace that match the properties specified by the first table and the second table;

obtaining a call flow by chronologically mapping the identified packets;

determining whether a packet associated with the call flow matches the properties specified by the third table by comparing an IE value contained in the packet to the IE value included in the third table; and based on the determining, creating a call flow validation results report indicating whether the call flow satisfied the properties specified in the multiple tables.

16. The at least one computer-readable medium of claim 15, comprising:

correlating the entry in the first table, the entry in the second table, and the entry in the third table using an identifier identifying a session and a session leg, wherein the entry in the first table includes the identifier and the base URI, wherein the entry in the second table includes the identifier and the specific resource URI, and wherein the entry in the third table includes the identifier and the IE value.

17. The at least one computer-readable medium of claim 15, wherein the entry in the second table includes a packet isolator IE, and wherein identifying packets further comprises:

identifying packets in the network trace matching a specified protocol to obtain protocol packets;

finding packets among the protocol packets containing a URI matching the base URI to obtain base URI packets;

finding packets among the base URI packets matching the specific resource URI to obtain specific URI packets; and finding packets among the specific URI packets matching the packet isolator IE to obtain the identified packets.

18. The at least one computer-readable medium of claim 15, wherein the entry in the first table includes the base URI and an identifier identifying a session and a session leg, and wherein obtaining the call flow comprises:

chronologically mapping the identified packets within the network trace having a type request to the session leg having a type matching the type request;

identifying all chronologically initial packets in the session leg having the type matching the type request to obtain a pivot packet;

creating a call flow stack using the pivot packet;

finding a chronologically subsequent packet to the pivot packet;

determining whether the chronologically subsequent packet corresponds to a session leg subsequent to the session leg;

upon determining that the chronologically subsequent packet corresponds to the session leg, adding the chronologically subsequent packet to the call flow stack;

determining whether each packet in the call flow stack belongs to a single call flow;

upon determining that each packet in the call flow stack belongs to the single call flow, retrieving a remainder of packets related to each packet in the call flow, wherein each packet among the remainder of packets has a type different from the type request; and, saving the remainder of packets in the call flow stack to obtain the call flow.

19. The at least one computer-readable medium of claim 15, wherein the entry in the first table includes the base URI and an identifier identifying a session and a session leg, and wherein obtaining the call flow comprises:

chronologically mapping the identified packets within the network trace having a type request to the session leg having a type matching the type request;

identifying all chronologically initial packets in the session leg having the type matching the type request to obtain a pivot packet;

creating a call flow stack using the pivot packet;

finding a chronologically subsequent packet to the pivot packet;

determining whether the chronologically subsequent packet corresponds to a session leg subsequent to the session leg;

upon determining that the chronologically subsequent packet does not correspond to the session leg, discarding the pivot packet;

upon determining that the chronologically subsequent packet does not correspond to the session leg, determining whether another pivot packet exists; and upon determining that the other pivot packet exists, attempting to obtain another call flow.

20. The at least one computer-readable medium of claim 15, wherein the entry in the first table includes the base URI and an identifier identifying a session and a session leg, and wherein obtaining the call flow comprises:

chronologically mapping the identified packets within the network trace having a type request to the session leg having a type matching the type request;

identifying all chronologically initial packets in the session leg having the type matching the type request to obtain a pivot packet;

creating a call flow stack using the pivot packet;

finding a chronologically subsequent packet to the pivot packet;

determining whether the chronologically subsequent packet corresponds to a session leg subsequent to the session leg;

upon determining that the chronologically subsequent packet does not correspond to the session leg, discarding the pivot packet;

upon determining that the chronologically subsequent packet does not correspond to the session leg, determining whether another pivot packet exists; and, upon determining that the another pivot packet does not exist, completing a search of the network trace.

* * * * *